United States Patent
Liu et al.

(10) Patent No.: US 12,503,955 B2
(45) Date of Patent: Dec. 23, 2025

(54) PRESSURE CONTROL IN A TURBOEXPANDER

(71) Applicant: Sapphire Technologies, Inc., Cerritos, CA (US)

(72) Inventors: Jeremy Liu, Norwalk, CA (US); John Stout, Cerritos, CA (US); James Ryan Yates, Rancho Santa Margarita, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 111 days.

(21) Appl. No.: 18/525,752

(22) Filed: Nov. 30, 2023

(65) Prior Publication Data
US 2025/0179929 A1    Jun. 5, 2025

(51) Int. Cl.
| | |
|---|---|
| *F01D 15/10* | (2006.01) |
| *F01D 11/00* | (2006.01) |
| *F01D 17/10* | (2006.01) |
| *F01D 25/16* | (2006.01) |

(52) U.S. Cl.
CPC ............ *F01D 15/10* (2013.01); *F01D 11/001* (2013.01); *F01D 17/105* (2013.01); *F01D 25/168* (2013.01); *F05D 2220/76* (2013.01)

(58) Field of Classification Search
CPC ...... F01D 15/10; F01D 11/001; F01D 17/105; F01D 25/168; F05D 2220/76
USPC .......................................... 290/52
See application file for complete search history.

(56) References Cited

U.S. PATENT DOCUMENTS

| | | | |
|---|---|---|---|
| 5,121,605 A * | 6/1992 | Oda .................... | F01D 5/10 |
| | | | 310/156.28 |
| 5,141,389 A * | 8/1992 | Bear ................. | F04D 29/0516 |
| | | | 277/408 |
| 7,638,892 B2 | 12/2009 | Myers | |
| 7,841,306 B2 | 11/2010 | Myers et al. | |
| 8,384,232 B2 | 2/2013 | Myers et al. | |
| 8,400,005 B2 | 3/2013 | Huber et al. | |
| 8,739,538 B2 | 6/2014 | Myers et al. | |
| 8,839,622 B2 | 9/2014 | Myers et al. | |
| 11,795,873 B1 | 10/2023 | Liu et al. | |
| 2008/0250789 A1 | 10/2008 | Myers et al. | |
| 2011/0173974 A1* | 7/2011 | Grabowska ........ | F02B 37/183 |
| | | | 60/602 |

(Continued)

FOREIGN PATENT DOCUMENTS

EP      2140110 A2    1/2010

OTHER PUBLICATIONS

International Search Report and Written Opinion in International Appln. No. PCT/US2024/057709, mailed on Mar. 26, 2025, 11 pages.

*Primary Examiner* — Charles Reid, Jr.
(74) *Attorney, Agent, or Firm* — Fish & Richardson P.C.

(57) ABSTRACT

A turboexpander with a turbine wheel coupled to drive a generator in response to a flow of incoming gas. A housing assembly of the turboexpander defines a sealed space, sealed from the incoming gas. The sealed space is in fluid communication with a surface of the turbine wheel such that pressure in the sealed space acts on the turbine wheel. A bypass passage communicates pressure between the sealed space and a space in communication with an outlet of the turbine wheel. The bypass passage includes an changeable flow area to control the communication of pressure between the sealed space and the outlet of the turbine wheel.

21 Claims, 4 Drawing Sheets

(56) References Cited

U.S. PATENT DOCUMENTS

2012/0306206 A1  12/2012  Agrawal et al.

* cited by examiner

PRESSURE CONTROL IN A TURBOEXPANDER

TECHNICAL FIELD

This disclosure relates to turboexpanders with accommodations for different operating conditions.

BACKGROUND

In a turboexpander system with a generator (a.k.a., a turbogenerator), a turbine wheel expands gas to produce rotation and drive a generator. The expansion of gas reduces its pressure. Thus, such systems can be operated to reduce the pressure of an incoming gas, in lieu of a valve or orifice. Often, the gas pressures and flow may change over the life of the turboexpander.

SUMMARY

This disclosure relates to turboexpanders with accommodations for different operating conditions.

Certain aspects encompass a turboexpander with a turbine wheel coupled to drive a generator in response to a flow of incoming gas. A housing assembly of the turboexpander defines a sealed space, sealed from the incoming gas. The sealed spaces is in fluid communication with a surface of the turbine wheel such that pressure in the sealed space acts on the turbine wheel. A bypass passage communicates pressure between the sealed space and a space in communication with an outlet of the turbine wheel. The bypass passage includes an changeable flow area to control the communication of pressure between the sealed space and the outlet of the turbine wheel.

Certain aspects encompass an electric power generation system having a turbogenerator housing assembly defining an inlet passage and an outlet passage and a turbine wheel within the housing assembly. The turbine wheel is positioned to receive gas from the inlet passage into an inlet of the turbine wheel and to expel gas from an outlet of the turbine wheel into the outlet passage. The turbine wheel is configured to rotate in response to expansion of the gas between the inlet and outlet of the turbine wheel. The system includes an electric stator and electric rotor. The electric rotor is coupled to the turbine wheel to rotate with the turbine wheel and generate electricity in the stator. A seal is provided in the housing assembly and configured to seal with the turbine wheel. The seal seals the received gas from a sealed space in the housing assembly. The sealed space is in fluid communication with a back face of the turbine wheel. The system includes a bypass passage between the sealed space and the outlet of the turbine wheel. The bypass passage has a changeable flow area configured to cause a pressure drop between the sealed space and the outlet of the turbine wheel when the turbine wheel is operated to expand the gas.

Certain aspects encompass a method where a flow of gas is received at an inlet of a turbine wheel of a turbogenerator which rotates the turbine wheel in response to expansion of the gas through the turbine wheel. A rotor of the turbogenerator is rotated in a stator of the turbogenerator with the turbine wheel to generate electricity in the stator. Pressure is communicated between a sealed space and the outlet of the turbine wheel via a passage with a changeable flow area that is configured to cause a pressure drop between the sealed space and the outlet of the turbine wheel when the turbine wheel is operated to expand the gas. The sealed space is sealed from the inlet of the turbine wheel and in fluid communication with a surface of the turbine wheel.

Certain of the aspects can include some, none or all of the following features. The pressure drop of the changeable flow area can be selected to bias the net axial load on the turbine wheel towards one direction when the turbine wheel is operated to expand gas. The changeable flow area can include a replaceable orifice. The changeable flow area can include a valve in the bypass passage. The valve is adjustable to change the flow area. The bypass passage can include a plurality of linearly drilled bores, one of which extends radially to the exterior of the housing assembly. The valve can be received in an exterior end of the linear bore extending to the exterior of the housing assembly. In certain instances, a second seal is provided in the housing assembly, downstream of the first mentioned seal. The second seal is configured to seal with the turbine wheel to direct flow into the inlet of the turbine wheel. The turbine wheel can be a shrouded circumferential turbine wheel, and the second seal seals with a shroud of the turbine wheel. The position of the first mentioned seal, the position of the second seal and the pressure difference can be selected to produce net axial loading on the turbine wheel towards one direction. In certain instances, the turboexpander is a flow through type, where the electric stator and electric rotor are between the outlet of the turbine wheel and the outlet of the turbogenerator and the gas must flow through the electric stator to the outlet of the turbogenerator.

The details of one or more implementations of the subject matter described within this disclosure are set forth in the accompanying drawings and the description below. Other features, objects, and advantages of the subject matter described herein will be apparent from the description and drawings, and from the claims.

DESCRIPTION OF DRAWINGS

Like reference symbols in the various drawings indicate like elements. The drawings are not to scale.

DETAILED DESCRIPTION

This disclosure encompasses a turboexpander with a turbine wheel coupled to drive a generator in response to a flow of incoming gas. A housing assembly of the turboexpander defines a sealed space, sealed from the incoming gas. The sealed space is in fluid communication with a surface of the turbine wheel such that pressure in the sealed space acts on the turbine wheel. A bypass passage communicates pressure between the sealed space and a space in communication with an outlet of the turbine wheel. The bypass passage includes an changeable flow area to control the communication of pressure between the sealed space and the outlet of the turbine wheel. The bypass passage, in certain instances, enables adjusting the net axial loads on the turbine wheel. More detail on the turboexpander is explained below.

Figure 1:
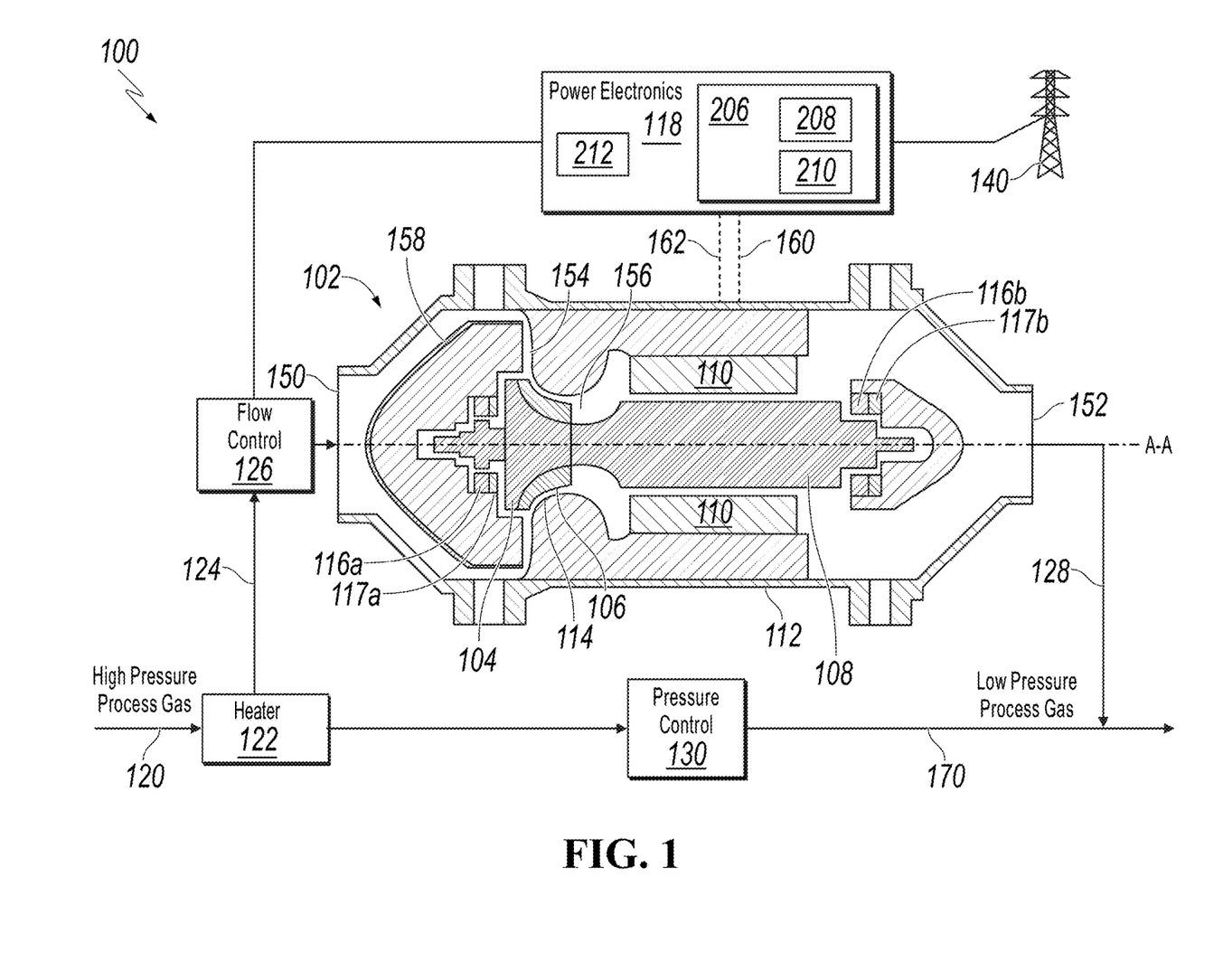
FIG. 1 is a schematic diagram of an electric power generation system in accordance with the concepts herein.

Turning to FIG. 1, natural gas wells produce at high pressure, sometimes as much as 9,000 PSIG (62.05 MPa) or even 15,000 PSIG (103.42 MPa). The pressure of the produced natural gas must be reduced prior to pre-processing, which separates particulates and moisture from the gas, and for transport via pipeline. The pipelines, for example, transport gasses from production sites to processing facilities and from processing facilities to local distribution networks, such as regional, city or district networks or on site industrial plants networks. The processes at the wellsite and intermediate pressure letdown stations use pressure control valves (i.e., choke or throttle valves) to achieve the required pressure drops, but also waste significant amounts of head pressure energy in the process. Additional pressure control valves can be used at other locations for pressure control within the sub-processes of the processing facilities and within the end user's processes and piping. An energy recovery system, according to the concepts herein, can be used in lieu of or in combination with one or more of these pressure control valves. The system includes a turboexpander (with a generator) that can be installed in-line in a flow line from the wellhead, often in parallel to a bypass flow line with a pressure control valve, to extract the wasted energy from pressure reduction and produce electrical power. The electrical power can be directed to a power grid or elsewhere. For example, some or all of the power can be used at the wellsite (onshore or offshore) to supply or offset the site's power needs, such as powering equipment at the wellsite or platform. Some production sites, especially offshore platforms, have no other source of electric power than that made on site (e.g., by running natural gas powered generators off the produced gas or by diesel fueled generators). Thus, the energy recovery system can bring power to production sites without burning the produced gas and the resultant emissions. In each instance, by recovering lost energy from produced natural gas, the energy recovery system can generate electricity while also reducing $CO_2$ emissions, increasing overall plant efficiency, offsetting electrical costs, and generating additional revenue.

FIG. 1 is a schematic diagram of an electric power generation system 100 coupled to a power grid 140 in accordance with embodiments of the present disclosure. As discussed in more detail below, the grid 140 may be a municipal grid, a microgrid, or the system 100 may be directly coupled to one or more pieces of equipment powered by its output. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by converting kinetic energy to rotational energy from gas expansion through a turbine wheel 104 and generating electrical energy. For example, rotation of the turbine wheel 104 can be used to rotate an electric rotor 108 within an electric stator 110, which then generates electrical energy in the stator 110.

The turboexpander 102 includes a high-performance, high-speed permanent magnet generator with an integrated radial in-flow expansion turbine wheel 104 and low loss active magnetic bearings (AMBs) 116a,b. The rotor assembly consists of the permanent magnet section with the turbine wheel 104 mounted directly to the rotor hub. The rotor 108 is levitated by the magnetic bearing system creating a frictionless (entirely or nearly frictionless) interface between dynamic and static components. The AMBs 116a,b facilitate a lossless (entirely or near lossless) rotation of the rotor 108.

The turboexpander 102 is designed to have the process gas flow through the system, which cools the generator section and eliminates the need for auxiliary cooling equipment. The power electronics 118 for the turboexpander 102 combines a Variable Speed Drive (VSD) 206 and Magnetic Bearing Controller (MBC) 212 into one cabinet, in some implementations. The VSD allows for a consistent and clean delivery of generated power from the turboexpander 102 to a power grid 140. For example, the VSD 206 regulates the frequency and/or amplitude of the generated current to match the grid and/or power requirements of its load. After expansion, the gas exits the turboexpander 102 along the same axial path for downstream processes.

The turboexpander 102 includes a flow-through configuration. The flow-through configuration permits process gas to flow from an inlet side of the turboexpander 102 to an outlet side of the turboexpander 102, where the inlet and outlet are centered on the same axis. Internally, the gas flows into a radial gas inlet 154 to a turbine wheel 104 and an axial gas outlet 156 from the turbine wheel 104. The gas then flows through the generator and out of the outlet 152, where the gas rejoins the gas pipeline 170. Generally, high pressure process gas 120 is directed to flow into the turboexpander 102 through a flow control system 126. The flow control system 126 includes a flow or mass control valve and an emergency shut off valve. In embodiments, the turboexpander housing 112 is hermetically sealed.

The high pressure process gas 120 is expanded by flowing through the turbine wheel 104, resulting in a pressure letdown of the process gas. Lower pressure process gas 128 exits the turboexpander 102. The expansion of the high pressure process gas 120 through the turbine wheel 104 causes the turbine wheel 104 to rotate, which causes the rotor 108 to rotate. The rotation of the rotor 108 within the stator 110 generates electrical energy. The turboexpander 102 achieves the desired pressure letdown and captures the energy from the pressure letdown to generate electricity. A pressure control valve 130, such as a conventional choke, can be installed in parallel to the turboexpander 102. The pressure control valve 130 can be used to control the pressure of the high pressure process gas 120 that flows in parallel to the turboexpander 102. Any excess high pressure process gas that is not directed into the turboexpander can be directed through the pressure control valve 130.

In some embodiments, a heater 122 can heat the high pressure process gas 120 prior to flowing the gas into the turboexpander 102. For example, if the expansion of the gas through the turbine wheel 104 would lower the temperature of the process gas to a point where moisture in the gas freezes and/or process gas components condense at, or downstream of, the turbine wheel or at other downstream locations in the pipeline, the pressurized process gas 120 can be heated by heater 122 prior to flowing through the turboexpander 102. Heated high pressure process gas 124 can then be directed into the turboexpander 102. The heating of the process gas can prevent freezing moisture or component condensation as the gas expands and its temperature drops.

The turboexpander 102 includes a turbine wheel 104. The turbine wheel 104 is shown as a radial inflow turbine wheel, though other configurations are within the scope of this disclosure, such as an axial flow turbine. In this example, heated high pressure process gas 124 is received from an inlet conduit 150 of the housing 112 enters a radially oriented inlet 154 to the turbine wheel 104. In certain embodiments, the fluid flows through an inlet conduit 150 and is diverted by a flow diverter 158 to a radial inlet 154 that directs the flow into the radial inflow of the turbine wheel 104. In the example turboexpander 102 of FIG. 1, the flow diverter 158 includes a cone-shaped nose that diverts the gas flow radially outward to the radial inlet 154. The flow diverter 158 can be connected to or integrally formed with the bearing 116a and sensor 117a at the inlet side of the turboexpander 102 and the supports for this bearing 116a and sensor 117a surrounding the axial end of the rotor 108 at the inlet end of the turboexpander 102. After expanding, the lower pressure process gas exits the turbine wheel 104 from an axially oriented outlet 156 to outlet conduit 152 of the housing 112 at the outlet end of the turboexpander 102.

The turbine wheel 104 can be directly affixed to the rotor 108, or to an intermediate common shaft, for example, by fasteners, rigid drive shaft, welding, or other manner. For example, the turbine wheel 104 may be received at an axial end of the rotor 108, and held to the rotor 108 with a shaft. The shaft threads into the rotor 108 at one end, and at the other end, captures the turbine wheel 104 between the end of rotor 108 and a nut threadingly received on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that react with the expanding process gas to cause the turbine wheel 104 to rotate. FIG. 1 shows an unshrouded turbine wheel, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas therebetween, as the process gas flows through the turbine wheel 104. Although some amount of the process gas may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turboexpander may be optimized to reduce the leakage. In embodiments, the housing 112 is hermetically sealed to prevent process gases from escaping the radial inlet 154 of the turbine wheel 104.

The shroud 114 may reside at a specified distance away from the turbine wheel blades 106, and is maintained at a distance away from the turbine wheel blades 106 during operation of the turboexpander 102 by using magnetic positioning devices, including active magnetic bearings and position sensors.

Bearings 116a and 116b are arranged to rotatably support the rotor 108 and turbine wheel 104 relative to the stator 110 and the shroud 114. The turbine wheel 104 is supported in a cantilevered manner by the bearings 116a and 116b. In embodiments, the turbine wheel 104 may be supported in a non-cantilevered manner and bearings 116a and 116b may be located on the outlet side of turbine wheel 104. In certain instances, one or more of the bearings 116a or 116b can include ball bearings, needle bearings, magnetic bearings, foil bearings, journal bearings, or other bearing types.

Bearings 116a and 116b may be a combination radial and thrust bearing, supporting the rotor 108 in radial and axial directions. Other configurations could be utilized. The bearings 116a and 116b need not be the same types of bearings.

In the embodiments in which the bearings 116a and 116b are magnetic bearings, a magnetic bearing controller (MBC) 212 is used to control the magnetic bearings 116a and 116b. Position sensors 117a, 117b can be used to detect the position or changes in the position of the turbine wheel 104 and/or rotor 108 relative to the housing 112 or other reference point (such as a specified value). Position sensors 117a, 117b are connected to the housing 112 directly or indirectly, and the position sensors 117a, 117b can detect axial and/or radial displacement of the rotor 108 and its connected components (e.g., turbine wheel 104) relative to the housing 112. The magnetic bearing 116a and/or 116b can respond to the information from the positions sensors 117a, 117b and adjust for the detected displacement, if necessary. The MBC 212 may receive information from the position sensor(s) 117a, 117b and process that information to provide control signals to the magnetic bearings 116a, 116b. MBC 212 can communicate with the various components of the turboexpander 102 across a communications channel 162.

The use of magnetic bearings 116a, 116b and position sensors 117a, 117b to maintain and/or adjust the position of the turbine wheel blades 106 such that the turbine wheel blades 106 stay in close proximity to the shroud 114 permits the turboexpander 102 to operate without the need for seals (e.g., without the need for dynamic seals). The use of the active magnetic bearings 116a,b in the turboexpander 102 eliminates physical contact between rotating and stationary components, as well as the need for lubrication, lubrication systems, and seals.

The turboexpander 102 may include one or more backup bearings. For example, in the event of a power outage that affects the operation of the magnetic bearings 116a and 116b, bearings may be used to rotatably support the turbine wheel 104 during that period of time. The backup bearings and may include ball bearings, needle bearings, journal bearings, or the like.

As mentioned previously, the turboexpander 102 is configured to generate electricity in response to the rotation of the rotor 108. In certain instances, the rotor 108 can include one or more permanent magnets coupled to the rotor 108, for example, on a radially outer surface of the rotor 108 adjacent to the stator 110. The stator 110 includes a plurality of conductive coils, for example, positioned adjacent to the magnet(s) on the rotor 108. Electrical current is generated by the rotation of the magnet(s) within the coils of the stator 110. The rotor 108 and stator 110 can be configured as a synchronous, permanent magnet, multiphase alternating current (AC) generator. The electrical output 160 can be a three-phase output, for example. In certain instances, stator 110 may include a plurality of coils (e.g., three or six coils for a three-phase AC output). When the rotor 108 is rotated, a voltage is induced in the stator coil. At any instant, the magnitude of the voltage induced in the coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electricity at that speed. Such a turboexpander 102 is what is referred to as a "high speed" turbine generator. For example, in embodiments, the turboexpander 102 can produce up to 135 kilowatts (kW) of power at a continuous speed of 25,000 revolutions per minute (rpm) of the rotor 108. In embodiments, the turboexpander 102 can produce on the order of 315 kW at certain rotational speeds (e.g., on the order of 23,000 rpm).

In some embodiments, the design of the turbine wheel 104, rotor 108, and/or stator 110 can be based on a desired parameter of the output gas from the turboexpander 102. For example, the design of the rotor 108 and stator 110 can be based on a desired temperature of the gas 124, 128 at input of the turboexpander 102, output of the turboexpander 102, or both.

In the example system 100 of FIG. 1, the turboexpander 102 is coupled to power electronics 118. Power electronics 118 includes the variable speed drive (VSD) 206 (or variable frequency drive) and the magnetic bearing controller (MBC) 212 (discussed above).

The electrical output 160 of the turboexpander 102 is connected to the VSD 206, which can be programmed to specific power requirements. The VSD 206 can include an insulated-gate bipolar transistor (IGBT) rectifier 208 to convert the variable frequency, high voltage output from the turboexpander 102 to a direct current (DC). The rectifier 208 can be a three-phase rectifier for three-phase AC input current. An inverter 210 then converts the DC from the rectifier AC for supplying to the power grid 140 (or other load). The inverter 210 can convert the DC to 380 VAC-480 VAC at 50 to 60 Hz for delivery to the power grid. The specific output of the VSD 206 depends on the power grid and application. Other conversion values are within the scope of this disclosure. The VSD 206 matches its output to the power grid 140 by sampling the grid voltage and frequency, and then changing the output voltage and frequency of the inverter 210 to match the sampled power grid voltage and frequency.

The turboexpander 102 is also connected to the MBC 212 in the power electronics 118. The MBC 212 constantly monitors position, current, temperature, and other parameters to ensure that the turboexpander 102 and the active magnetic bearings 116a and 116b are operating as desired. For example, the MBC 212 is coupled to position sensors 117a, 117b to monitor radial and/or axial position of the turbine wheel 104 and the rotor 108. The MBC 212 can control the magnetic bearings 116a, 116b to selectively change the stiffness and damping characteristics of the magnetic bearings 116a, 116b as a function of spin speed. The MBC 212 can also control synchronous cancellation, including automatic balancing control, adaptive vibration control, adaptive vibration rejection, and unbalance force rejection control.

Figure 2A:
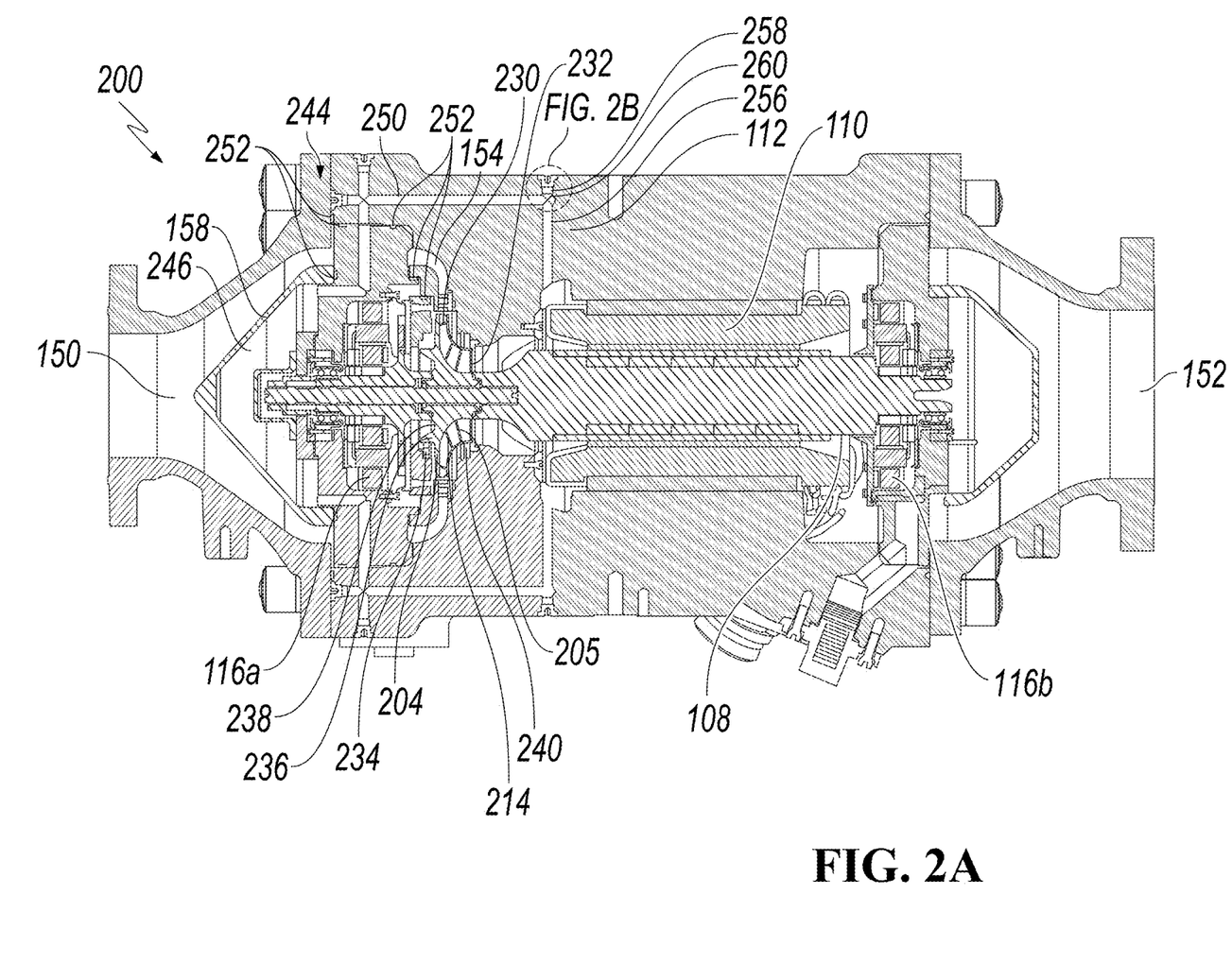
FIG. 2A is a schematic half cross-sectional view of an example turboexpander in accordance with the concepts herein.

FIG. 2A is a half cross-sectional view of an example turboexpander 200 that can be used as turboexpander 102. The turboexpander 200 is the same as turboexpander 102, except as noted below. For example, the turbine wheel 204 is a shrouded centrifugal type wheel that, instead of having blades 106 that pass close to and seal with a stationary shroud 114, has a shroud 214 that is integral with the remainder of the wheel 204. The shroud 214 is affixed atop the blades 205, and defines the outer surface of the wheel 204 between the wheel inlet 230 and the wheel outlet 232. The shroud 214 and blades 205 define enclosed aerodynamic passages that extend between the wheel inlet 230 and wheel outlet 232.

In either instance, (shrouded or unshrouded) an annular seal 234 seals between the wheel 204 (or wheel 104), at or around the wheel inlet 230, and the housing assembly 244 defining the radial inlet passage 154. The seal 234 causes flow from the radial inlet passage 154 to be directed into the wheel inlet 230, rather than flow into the space adjacent the back face 238 of the wheel 204. The seal 234 is shown sealing with the outer, radial surface of an annular fin 236 extending axially from the back face 238 of the wheel 204. The fin 236 extends towards the upstream end of the turboexpander 200. The seal 234 can be carried on the assembly 244 and seal to the fin 236, be carried on the fin 236 and seal to the assembly 244, or be a two part seal with interfacing parts on each of the fin 236 and assembly 244.

In the case of a shrouded wheel 204, a second annular seal 240 encircles the shroud 214 and seals between the shroud 214 and the housing assembly 244 defining the outlet passage 156. The seal 240 at the shroud 214 is on an opposite side of the wheel inlet 230 from the seal 234, and between the wheel inlet 230 and the wheel outlet 232. The seal 240 at the shroud 214 prevents flow from the radial inlet passage 154 bypassing the wheel 204 to the space around the wheel outlet 232 and the outlet passage 156. The seal 234 can be carried on the assembly 244 and seal to the shroud 214, be carried on the shroud and seal to the assembly 244, or be a two part seal with interfacing parts on each of the shroud 214 and assembly 244.

In FIG. 2A, the housing assembly 244 that supports the upstream bearings 116a, and the flow diverter 158 and that defines the radially inlet passage 154 and outlet passage 156, includes seals 252 sealing the parts of assembly 244 against passage of gas therebetween. The interior of the flow diverter 158, the space accommodating the bearings 116a and the space radially inward of the annular fin 236 and seal 234 are in fluid communication with one another and form a common sealed space 246 upstream of the seal 234. The sealed space 246 is sealed from the gas received through the radial inlet passage 154. The back face 238 of the turbine wheel 204 radially inward of the seal 234 defines a portion of the perimeter of the sealed space 246, such that the pressure in the sealed space 246 is communicated to and acts on the back face 238.

In operation, gas flows from the radial inlet passage 154 at high pressure into the wheel inlet 230 between the seals 234, 240, and expanded through the wheel 204. The gas at the wheel inlet 230 is thus at a high pressure relative to the gas at the wheel outlet 232. To the extent the seal 234 at the wheel inlet 230 is not precisely at the wheel inlet 230, the pressure of the gas on the inlet side of the seal 234 acts on the back face 238 of the wheel 204, generating an axial thrust force tending to drive the wheel 204 axially toward the downstream end of the turboexpander 200. Some amount of the high pressure gas from the inlet passage [153] 154 may leak past the seal 234 into the sealed space 246 and act on the back face 238 within the diameter of the seal 234, also generating a thrust force. The total thrust force generated by pressure acting on the back face 238 is proportional to the area of the back face 238 exposed to the gas and the pressure of the gas at the exposed areas.

To the extent the seal 240 on the shroud 214 is not precisely at the wheel inlet 230, the pressure of the gas on the inlet side of the seal 240 acts on the shroud 214, generating an axial thrust force tending to drive the wheel 204 axially toward the upstream end of the turboexpander 200. Some amount of the gas may leak past the seal 240 and, together with the gas exiting the wheel outlet 232, act on the shroud 214 outside seal 240 and the end surfaces of the wheel, also generating a thrust force. The total thrust force generated by pressure acting on the wheel shroud 214 and end surfaces of the wheel is a function of the area of the shroud 214 and end faces exposed to the gas and the pressure of the gas at the exposed areas.

The net axial thrust load on the turboexpander wheel 204 includes the forces due to pressure, as well as dynamic loads. The forces due to pressure include the axial forces generated by the pressure acting on the back face 238 (in one axial direction), the axial forces generated by pressure acting on the shroud 214 and end faces of the wheel 204 (in the opposing axial direction), and any axial forces due to the gas expanding through the aerodynamic passages of the wheel 204. Furthermore, the aerodynamic drag of the gasses flowing through the air gap between the electric rotor 108 and the stator 110 act on the wheel 204 via the connection between the wheel 204 and the rotor 108. For a given turboexpander, the net axial thrust load due to pressure can vary as pressure and flow conditions of the gas flowing to the wheel 204 and downstream of the wheel 204 change. The net axial thrust load must be carried by the bearings 116 a, b. Thus, the size of the bearings can be reduced if the net axial thrust load due to pressure is zero (i.e., balanced) or controlled to be biased in one direction but maintained at or around a specified axial load.

The location of the seals 234, 240 can be selected to produce specified axial thrust forces on the wheel 204. For example, the wheel 204 can be designed with the radial position of the annular fin 236 and seal 234 to produce a specified area of the back face 238 of the wheel 204 on which the incoming high pressure gas from the radial inlet 154 acts, and a different specified area within the sealed space 246 on which the gas in the sealed space acts. Providing the fin 236 at a smaller diameter yields a greater area on which the high pressure gas acts. When the high pressure gas is at a higher pressure than gas in the sealed space 246 (the typical operating condition), this greater area produces a greater thrust force on the wheel 204 towards the downstream end of the turboexpander 200. Providing the fin 236 at a larger diameter yields a smaller area on which the high pressure gas acts, and typically a smaller thrust force on the wheel 204 towards the downstream end of the turboexpander 200. The same applies to an unshrouded wheel 104 (e.g., FIG. 1). Providing the seal 240 on the shroud 214 closer to the wheel outlet 232 yields a greater area on the shroud 214 on which the high pressure gas acts, and typically a greater thrust force on the wheel 204 towards the upstream end of the turboexpander 200. Providing the seal 240 on the shroud 214 closer to the wheel inlet 230 yields a smaller area on the shroud 214 on which the high pressure gas acts, and thus a smaller thrust force on the wheel 204 towards the upstream end of the turboexpander 200. In certain instances, the location of the seals 234, 240 can be selected during the turboexpander 200 design to produce equal (precisely or nearly equal, e.g., within 2%, 5% or 10% of one another) but opposite thrust forces at specified operating conditions (e.g., the primary expected operating conditions). In certain instances, the location of the seals 234, 240 can be selected to produce a thrust bias on the wheel 204 at specified operating conditions (e.g., the primary expected operating conditions), where the net axial load on the wheel 204 is towards one axial direction, such toward the upstream or downstream end of the turboexpander 200.

The turboexpander 200 (or turboexpander 102) can additionally include a bypass passage 250 extending between and communicating the space radially inward of the seal 234 and a location downstream of the seal 240, for example, downstream of the wheel outlet 232, in the outlet passage 156. In FIG. 2A, the bypass passage 250 is shown with an open end into the sealed space 246, in the interior of the flow diverter 158, but the bypass passage 250 could have its open end in other areas of this space. The bypass passage 250 has another open end downstream of seal 240, shown in FIG. 2A as in the outlet passage 156. Thus, the bypass passage 250 communicates pressure between this common sealed space 246 and the gas in the outlet passage 156. The passage 250 includes a changeable flow area configured to produce a controlled pressure drop between the sealed space 246 and the gas in the outlet passage 156.

The bypass passage 250 of FIG. 2A is shown as a bore through the parts of the assembly 244, but could alternately be configured as a tubing or partially a tubing. The bypass passage of FIG. 2A is linearly bored, constructed as multiple, connected linear bores, with a radial bore 256 extending radially from the exterior side of the turboexpander 200. As better seen in the detail view of FIG. 2B, the radial bore 256 extends past the remainder of the bypass passage 250 and includes a valve 258 received into the open end 260 of the bore 256 at the exterior of the turboexpander 200. The valve 258 is shown threaded into the open end 260, but could be attached in another manner. The valve 258 can be adjusted from the exterior of the turboexpander 200 to impinge into and restrict the bypass passage 250 or be withdrawn from the passage to increase the flow area of gas through the bypass passage 250. Thus, the valve 258 controls the pressure through the bypass passage 250 and can be closed to fully seal the sealed space 246. Valve 258 is shown as having a moveable pintle (moved by threading in/out) the impinges into the bypass passage 250. In other instances, in lieu of or in addition to valve 258, the bypass passage 250 can include a fixed, but replaceable orifice, a variable orifice and/or another configuration of valve.

The changeable flow area in the bypass passage 250 can be used to adjust the net axial load on the wheel 204, including biasing the loading on the wheel 204 in one axial direction or balancing the loading on the wheel 204 (the thrust bias) produced as a result of the location of the seals 234, 240 at specified operating conditions (e.g., the primary expected operating conditions). For example, the bypass passage 250 can bleed pressure from the sealed space 246 to the outlet passage 156 to reduce the pressure acting on the back face 238 of the wheel 204 or vice versa. Reducing the pressure on the back face 238 reduces the thrust load toward the downstream end of the turboexpander 200 and vice versa. The valve 258 can be adjusted to control the pressure in the sealed space 246, and thus net axial pressure load on the wheel 204, in response to the conditions of the gas in the inlet passage 154 and/or the outlet passage 156 and/or other operating conditions of the turboexpander 200. The valve 258 can be set as part of the initial installation of the turboexpander 200, and checked and adjusted periodically over the life of the turboexpander 200 and when the gas conditions change. Thus, by adjusting the valve 258, the net axial load on the wheel 204 can be maintained despite changes in operating conditions (e.g., pressure) at the wheel inlet and/or outlet. The valve 258 can be set fully open to allow the full flow area of the bypass passage 250 and correspondingly least resistance to pressure exchange between the sealed space 246 and outlet passage 156, fully closed to close the sealed space 246 so no pressure exchanges (i.e., so the sealed space 246 stays at constant pressure regardless of gas conditions), or at an intermediate position to restrict the flow and pressure exchanged with the outlet passage 156.

If a specified net axial load on the wheel 204 due to pressure (e.g., balanced loading or biased in one axial direction) cannot be achieved through selection of the location of the seals 234, 240 at the design phase, or if the operating conditions of the turboexpander 200 vary, the valve 258 can be adjusted to affect the pressure in the sealed space 246, and thus the net axial pressure load on the wheel 204, to achieve or get closer to the specified net axial load on the wheel 204.

Figure 2B:
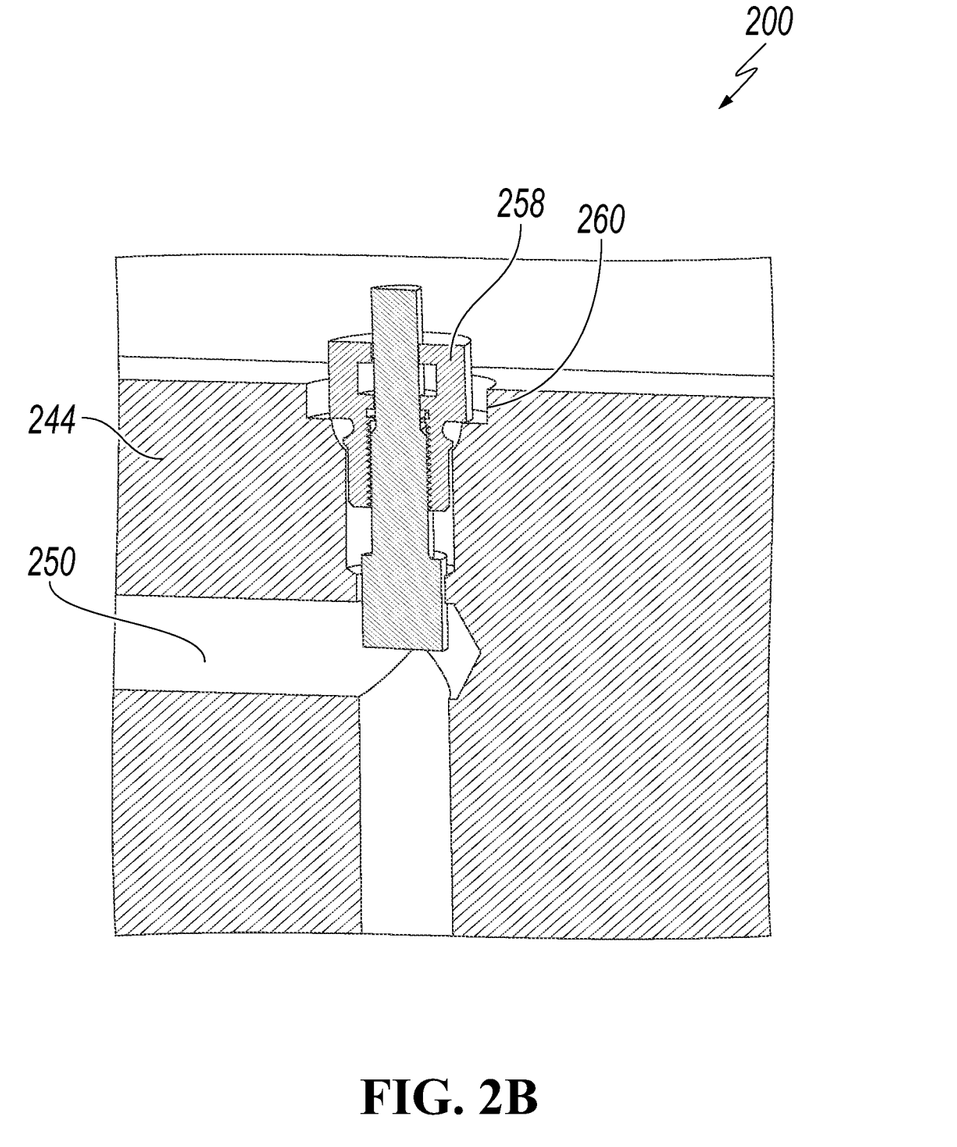
FIG. 2B is a detail view of a portion of FIG. 2A.
Figure 3:
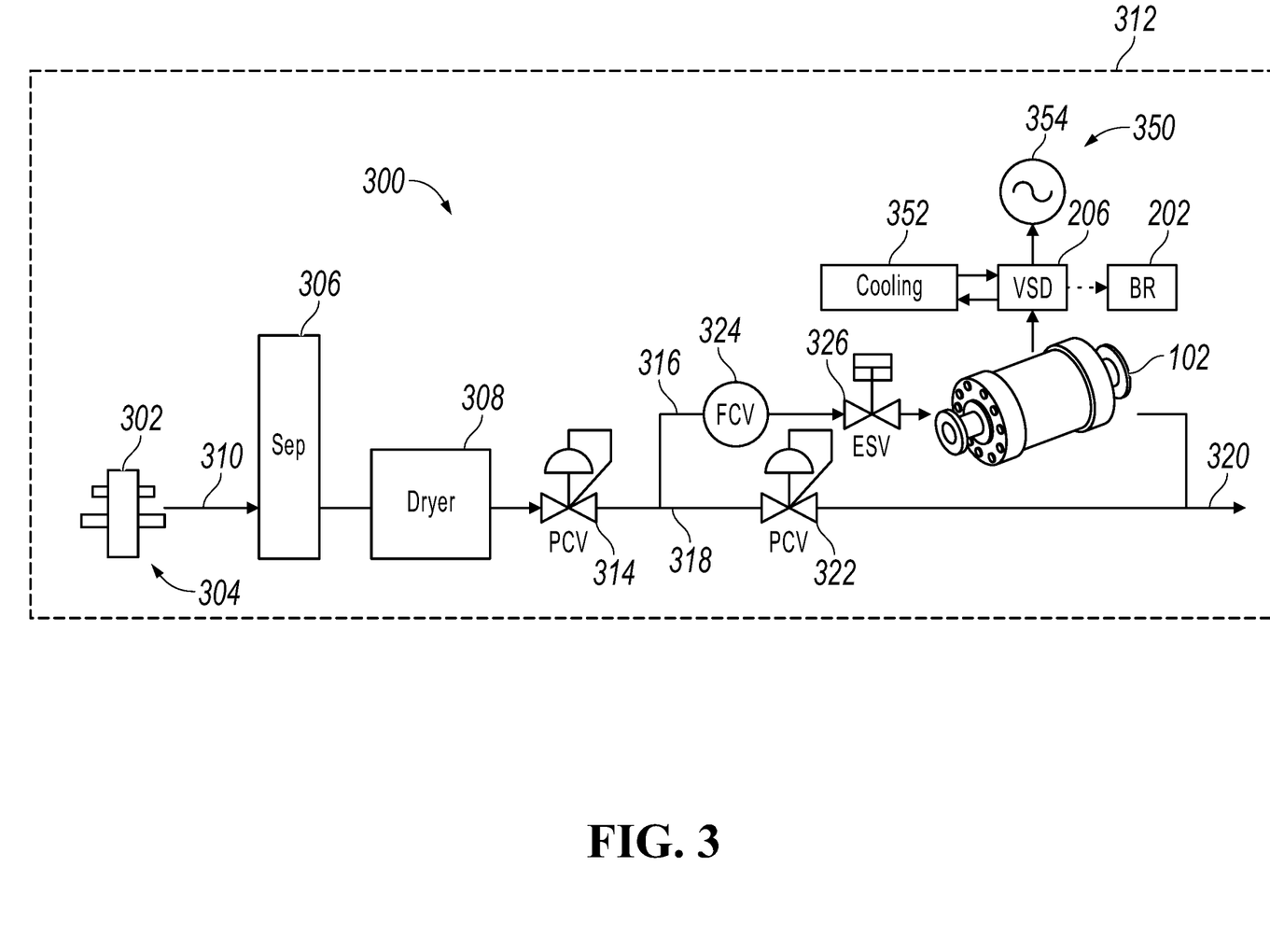
FIG. 3 is a schematic diagram of an example energy recovery system with an electric power generation system in accordance with the concepts herein.

FIG. 3 shows an example energy recovery system 300 using a turboexpander 102 as in FIG. 1 (or FIGS. 2A-2B). The turboexpander 102 is shown coupled to and between a wellhead 302 of a well 304 and a production pipeline 320. The production pipeline 320 is the pipeline that communicates the produced fluids from the well 304 to one or more processing facilities (not show) and ultimately on to the end user. The system 300 includes an electric power generation system 350, with the turboexpander 102 (with generator), for recovering energy from reducing the pressure of the produced fluids from the well 304, as well as associated flow lines and other equipment. In certain instances, the system 300 resides at the production site 312, in proximity to the wellhead 302. In certain instances, the system 300 resides on or off the production site 312, upstream of the production pipeline 320. In one example of a land based well 304, the production site 312 is, and the system 300 resides on, the site with the other near well 304 equipment, upstream of the production pipeline 320. In another example, multiple land based wells 304 are on the same production site 312 feeding to the same pipeline 320, and the system 300 is coupled to one or more of the wells 304 and resides on the site 312. In one example of a subsea well 304, the production site 312 is, and system 300 resides on, a platform at the ocean surface. The platform can be a production platform corresponding to the well 304 (i.e., a subsea well), or it can be at a production platform associated with multiple of subsea wells 304, for example, where the wells 304 are manifolded to flow to a single production platform. In certain instances, the system 300 can reside on a dedicated platform apart from any production platform, and be coupled by a flow line to one or more other production platforms.

In certain instances, the electric power generation system 350 is the same as the electric power generation system 100. With reference to FIGS. 1 and 2A-B, the system 350 includes, among other things of system 100, the above described turboexpander 102 in a hermetic housing 112 with a bypass passage 250, the electrical output of the generator of the turboexpander 102 being coupled to power electronics 118, including a VSD 206 with, in some instances, a brake resistor assembly 202. The turboexpander 102 can be configured to handle the gas conditions produced by the well 304, for example, configured to handle a specified amount of liquid in the gas, particulate in the gas, as well as to be resistant to corrosive aspects (e.g., hydrogen sulfide) in the gas. In certain instances, the VSD 206 can be coupled to a cooling system 352 to cool the electronics of the VSD 206 to maintain temperatures below a specified operating temperature. The output of the VSD 206 can be electrically coupled to a load 354, such as a power grid to supply power to the grid, as described above, a microgrid at the production site 312 for supplying power to equipment used for producing or treating gas at the production site 312, and/or directly to one or more pieces of equipment used for producing or treating gas at the production site 312 to supply power to the equipment. In certain instances, the equipment includes flow, pressure, temperature, and level sensors of various equipment, valve actuators, communications equipment for allowing remote communication with the sensors, other equipment and control of the valve actuators, separators (e.g., sand separators, liquid separators), heater treaters, site lighting, control trailers and/or other types of equipment. In certain instances, the electricity produced by the electric power generation system 350 can be used by other equipment at the production site 312 not involved in producing or treating the gas from the well 304. For example, the electricity can be used to power a hydrogen electrolyzer in a process on the production site 312 for producing hydrogen from the water.

The system 300 includes an inlet flow line 310 coupled to an outlet of the wellhead 302. Well production, that is primarily gaseous natural gas (but often also has some oil, water, moisture, and particulate), flows from the wellhead 302, and flows through flow line 310. The flow line 310 includes flow conditioning equipment to condition the flow to specified conditions selected based on the specification of pipeline 320 and equipment downstream of the production site 312, as well as based on the characteristics of the turboexpander 102 of the electric power generation system 350. In FIG. 3 the conditioning equipment is shown as a solids and liquids separator 306 and a dryer 308, but the conditioning equipment could include additional, different or fewer pieces and types of equipment. For example, the conditioning equipment can include separators, molecular dries, knock-out drums, two-phase coalescers and/or other types of conditioning equipment. Turning back to the specific example of FIG. 3, flow in flow line 310 flows from the wellhead 302 to and through the separator 306. In the separator 306, solids and liquids are separated from the gaseous flow. Thereafter, the flow flows through the flow line 310 to the dryer 308, where it is dried to reduce moisture in the flow to a specified level selected (in part or entirely) based on the specification of the turboexpander 102 of the electric power generation system 350. From the dryer 308, the flow flows through the flow line 310 to a pressure control valve 314. The pressure control valve 314 can be controlled to reduce the pressure of the gas flow to a specified pressure. Each of the valves herein, whether control or isolation or other, can be remote controlled, e.g., via an operator at a remote control board on the production site 312 or elsewhere or both, and/or autonomously controlled by a control algorithm of a controller residing at the production site 312 or elsewhere or both.

Flow from the pressure control valve 314 is split into a first downstream flow line 316 that includes an electric power generation system 350, including a turboexpander 102, and a second downstream flow line 318 that bypasses the turboexpander 102. The first downstream flow line 316 and second downstream flow line 318 recombine upstream of the production pipeline 320 before leaving the production site 312. The inlet of the hermetic housing 112 is hermetically coupled in-line with first flow line 316 so that all fluid in the flow line 316 is directed into the hermetic housing 112, flows through the housing 112, and back into the remainder of first flow line 316.

The second flow line 318 includes a pressure control valve 322 (e.g., pressure control valve 130) configured with a specified pressure drop to actuation position correlation. The pressure control valve 322 can be controlled to regulate the pressure in the second flow line 318 downstream of the valve 322, and in turn (as a function of the pressure of the flow coming from the well) the pressure upstream of the pressure control valve 322 and the pressure in the first flow line 316. The first flow line 316 includes a flow control valve 324 (e.g., flow control valve 126), configured with a specified flow rate to actuation position correlation. The flow control valve 324 can be controlled in relation to the pressure control valves 314, 322 to control the flow rate of fluid flowing through the first flow line 316, and thus the flow rate of flowing through the turboexpander 102.

This arrangement provides the turboexpander 102 in parallel to the second flow line 318, and as will be discussed in more detail below, allows freedom in sizing the turboexpander 102 relative to the pressure and flow rate of flow produced from the well 304 as well as relative to the conditions of the pipeline 320. The freedom stems, in part, from the second flow line 318 allowing flow to selectively bypass the turboexpander 102 in flowing from the wellhead 302 to the production pipeline 320. In short, however, all flow need not pass through the turboexpander 102 in flowing from the wellhead 302 to the pipeline 320, so the turboexpander 102 need not be sized to receive all of the flow. The first flow line 316 also includes an emergency shut-off valve 326 upstream of the turboexpander 102 to quickly shut off flow to the turboexpander 102, if needed. When closed, the entirety of the flow flows through the second flow line 318. Notably, although not shown, the inlet flow line 310, first flow line 316 and second flow line 318 can additionally be instrumented with sensors to monitor the pressure, temperature, flow rate, and/or other characteristics of the flow in each line and upstream and/or downstream of each component (e.g., valves, turboexpander and other components in the flow lines).

In operation, when the well 304 is new and first put on production, the fluids produced from the well 304 are at or near their highest pressure and flow rate. Over time, the pressure of the produced fluids declines, as does the flow rate of the produced fluids. Thus, pressure of the production flow is regulated with the pressure control valve 314 in the flow line 310 to a specified pressure. The pressure control valve 322 in the second flow line 318 is, in turn, controlled to maintain the pressure through the first flow line 316 and through the turboexpander 102 so that together with the flow control valve 324 the conditions through the turboexpander 102 are maintained within the turboexpander's specified operating range. Excess flow exits the second flow line 318 and is directed to the pipeline 320. The flow through the first flow line 316 flows through the turboexpander 102, generating power, and then back to recombine with the flow from the second flow line 318 and on to the pipeline 320.

A number of implementations have been described. Nevertheless, it will be understood that various modifications may be made without departing from the spirit and scope of this disclosure. Accordingly, other implementations are within the scope of the following claims.

What is claimed is:

1. An electric power generation system, comprising:
   a turbogenerator housing assembly defining an inlet passage and an outlet passage;
   a turbine wheel within the housing assembly, the turbine wheel positioned to receive gas from the inlet passage into an inlet of the turbine wheel and to expel gas from an outlet of the turbine wheel into the outlet passage, the turbine wheel configured to rotate in response to expansion of the gas between the inlet and outlet of the turbine wheel;
   an electric stator and electric rotor, the electric rotor coupled to the turbine wheel to rotate with the turbine wheel and generate electricity in the stator;
   a seal in the housing assembly configured to seal with the turbine wheel and seal the received gas from a sealed space in the housing assembly, the sealed space being in fluid communication with a back face of the turbine wheel; and
   a bypass passage between the sealed space and the outlet of the turbine wheel, the bypass passage comprising a changeable flow area configured to cause a pressure drop between the sealed space and the outlet of the turbine wheel when the turbine wheel is operated to expand the gas.

2. The electric power generation system of claim 1, where the pressure drop is selected to bias the net axial load on the turbine wheel towards one direction when the turbine wheel is operated to expand gas.

3. The electric power generation system of claim 1, wherein the bypass passage comprising a replaceable orifice defining the changeable flow area.

4. The electric power generation system of claim 1, comprising a valve in the bypass passage defining the changeable flow area.

5. The electric power generation system of claim 4, where the valve is adjustable to change the flow area.

6. The electric power generation system of claim 5, where the bypass passage comprises a plurality of linearly drilled bores, one of which extends radially to the exterior of the housing assembly; and
   where the valve is received in an exterior end of the linear bore extending to the exterior of the housing assembly.

7. The electric power generation system of claim 1, comprising a second seal in the housing assembly, downstream of the first mentioned seal and configured to seal with the turbine wheel to direct flow into the inlet of the turbine wheel.

8. The electric power generation system of claim 7, where the turbine wheel comprises a shrouded circumferential turbine wheel, and where the second seal seals with a shroud of the turbine wheel.

9. The electric power generation system of claim 8, where the position of the first mentioned seal, the position of the second seal and the pressure difference are selected to produce net axial loading on the turbine wheel towards one direction.

10. The electric power generation system of claim 9, where the changeable flow area is configured to counter the net axial loading generated by the position of the first mentioned seal and the second mentioned seal.

11. The electric power generation system of claim 1, where the electric stator and electric rotor are between the outlet of the turbine wheel and the outlet of the turbogenerator and the gas must flow through the electric stator to the outlet of the turbogenerator.

12. The electric power generation system of claim 1, comprising an active magnetic axial thrust bearing in the sealed space.

13. A method, comprising:
   receiving a flow of gas at an inlet of a turbine wheel of a turbogenerator and rotating the turbine wheel in response to expansion of the gas through the turbine wheel;
   rotating a rotor of the turbogenerator in a stator of the turbogenerator with the turbine wheel to generate electricity in the stator; and
   communicating pressure between a sealed space and an outlet of the turbine wheel via a passage with a changeable flow area configured to cause a pressure drop between the sealed space and the outlet of the turbine wheel when the turbine wheel is operated to expand the gas, the sealed space sealed from the inlet of the turbine wheel and in fluid communication with a surface of the turbine wheel.

14. The method of claim 13, comprising biasing the net axial load on the turbine wheel towards one direction with the pressure in the sealed space while operating the turbine wheel to expand the gas.

15. The method of claim 14, comprising adjusting the flow area in response to the pressure at the outlet of the turbine wheel.

16. The method of claim 15, comprising adjusting the flow area to maintain the net axial load substantially constant despite pressure changes at the inlet or outlet of the turbine wheel.

17. The method of claim 13, where the flow area comprises at least one of an orifice or a valve.

18. The method of claim 13, where the turbine wheel comprises a shrouded wheel and where the method comprises:
   sealing the outlet of the turbine wheel from the inlet of the turbine wheel from process gas passage between blades of the turbine wheel and the shroud of the turbine wheel with a seal on the shroud of the turbine wheel; and
   biasing the net axial load on the turbine wheel, while operating the turbine wheel to expand gas, towards one direction with the pressure in the sealed space and the pressure acting on the shroud of the turbine wheel.

19. A turbogenerator, comprising:
   a turbine wheel coupled to drive a generator in response to a flow of incoming gas;
   a housing assembly defining a sealed space, sealed from the incoming gas and in fluid communication with a surface of the turbine wheel; and
   a bypass passage communicating pressure between the sealed space and a space in communication with an outlet of the turbine wheel, the bypass passage comprising a changeable flow area.

20. The turbogenerator of claim 19, where the bypass passage comprises a valve defining the flow area.

21. The turbogenerator of claim 19, where the sealed space is defined in part by a first seal with the turbine wheel on one side of an inlet of the turbine wheel and a second seal on an opposing side of the inlet of the turbine wheel, between the inlet of the turbine wheel and the outlet of the turbine wheel and sealing to a shroud of the turbine wheel, and
   where the pressure acting on the surface of the turbine wheel and the pressure acting on shroud of the turbine wheel are controlled to bias the net axial load on the turbine wheel in one direction.

* * * * *